US009176796B2

(12) United States Patent
Dake (10) Patent No.: US 9,176,796 B2
(45) Date of Patent: Nov. 3, 2015

(54) SHARED MEMORY REUSABLE IPC LIBRARY

(75) Inventor: Steven Dake, Flagstaff, AZ (US)

(73) Assignee: Red Hat, Inc., Raleigh, NC (US)

( * ) Notice: Subject to any disclaimer, the term of this patent is extended or adjusted under 35 U.S.C. 154(b) by 1181 days.

(21) Appl. No.: 12/475,387

(22) Filed: May 29, 2009

(65) Prior Publication Data

US 2010/0306783 A1    Dec. 2, 2010

(51) Int. Cl.
*G06F 3/00* (2006.01)
*G06F 9/54* (2006.01)

(52) U.S. Cl.
CPC ............... *G06F 9/546* (2013.01); *G06F 9/547* (2013.01); *G06F 2209/541* (2013.01)

(58) Field of Classification Search
CPC ................................ G06F 9/547; H04L 67/42
See application file for complete search history.

(56) References Cited

U.S. PATENT DOCUMENTS

| | | | | |
|---|---|---|---|---|
| 5,930,473 | A * | 7/1999 | Teng et al. ............... | 709/204 |
| 6,341,312 | B1 * | 1/2002 | French et al. ............ | 709/227 |
| 6,366,958 | B1 * | 4/2002 | Ainsworth et al. ....... | 709/230 |
| 7,870,558 | B2 * | 1/2011 | Fernandes et al. ....... | 719/313 |
| 2003/0149797 | A1 * | 8/2003 | Nagarajayya et al. ..... | 709/313 |
| 2006/0200828 | A1 * | 9/2006 | Na ........................ | 719/313 |
| 2008/0034379 | A1 * | 2/2008 | Dale et al. .............. | 719/321 |

* cited by examiner

*Primary Examiner* — Sisley Kim
(74) *Attorney, Agent, or Firm* — Lowenstein Sandler LLP (57) ABSTRACT

An apparatus and a method for a shared reusable (IPC) library. The shared reusable IPC library includes a client IPC library and a server IPC library. The client IPC library communicates with a client application. The server IPC library communicates with the sender application. The client IPC library includes instructions for creating, destroying, sending, or receiving IPC messages to and from the client application. The server IPC library includes an initialization function for the server application.

20 Claims, 7 Drawing Sheets

SHARED MEMORY REUSABLE IPC LIBRARY

TECHNICAL FIELD

Embodiments of the present invention relate to computing systems, and more particularly, to computer programs.

BACKGROUND

Inter Process Communication (IPC) is a set of techniques for the exchange of data among multiple threads in one or more processes. Processes may be running on one or more computers connected by a network. IPC techniques are divided into methods for message passing, synchronization, shared memory, and remote procedure calls (RPC). The method of IPC used may vary based on the bandwidth and latency of communication between the threads, and the type of data being communicated.

Client/Server high performance IPC is difficult to write because every client and server uses their own implementation of sockets, shared memory, among other things. The problem with this approach is that it provides a huge code base of possibly buggy implementations, instead of one unified implementation.

BRIEF DESCRIPTION OF THE DRAWINGS

The present invention is illustrated by way of example, and not by way of limitation, in the figures of the accompanying drawings and in which.

DETAILED DESCRIPTION

Described herein is an apparatus and a method for a shared reusable (IPC) library. The shared reusable IPC library includes a client IPC library and a server IPC library. The client IPC library communicates with a client application. The server IPC library communicates with the server application. The client IPC library includes instructions for creating, destroying sending, and receiving IPC messages to and from the client application. The server IPC library includes an initialization function for the server application.

Figure 1A:
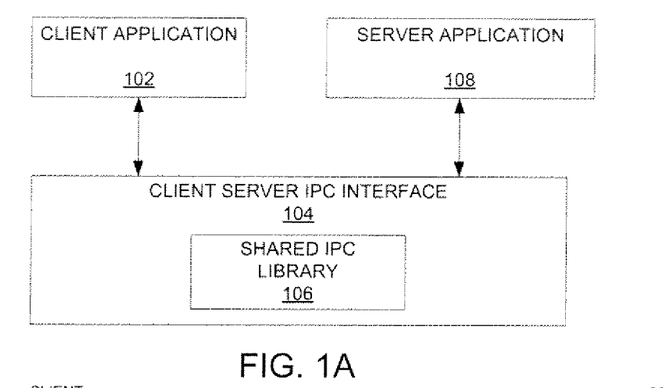
FIG. 1A is a block diagram illustrating one embodiment of a client server IPC interface system.
Figure 1B:
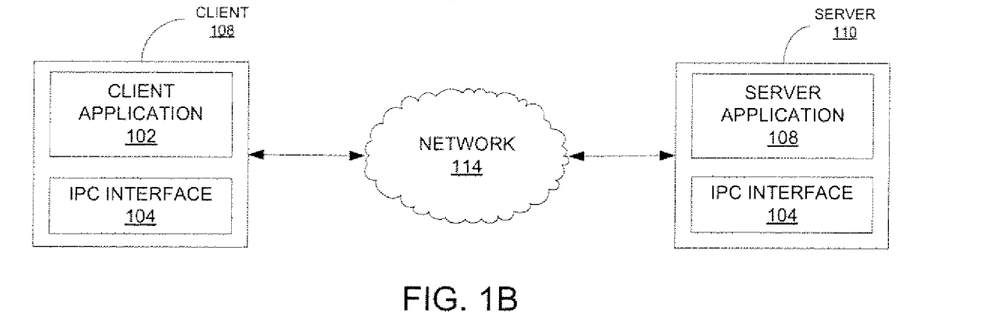
FIG. 1B is a block diagram illustrating one embodiment of a system for sharing a reusable IPC library

FIG. 1A is a block diagram illustrating one embodiment of a client server IPC interface system. A client application 102 communicates with a server application 108 with a client server IPC interface 104. Client server IPC interface 104 includes a shared reusable IPC library 106. In one embodiment, IPC library 106 includes a client IPC library and a server IPC library. The IPC client library is responsible for providing the mechanisms for IPC to create, destroy, send and receive IPC messages. The IPC server library is responsible for providing the server portion of the IPC. The two shared libraries are available for developing IPC client applications. It should be noted that client application 102 and server application 108 may reside on the same or different machines. For example, FIG. 1B illustrates one embodiment where client application 102 resides on a client machine 108 and server application 108 resides on a sever machine 110. Both client machine 108 and server machine 110 communicate with a computer network 114 with IPC interface 104.

Figure 1C:
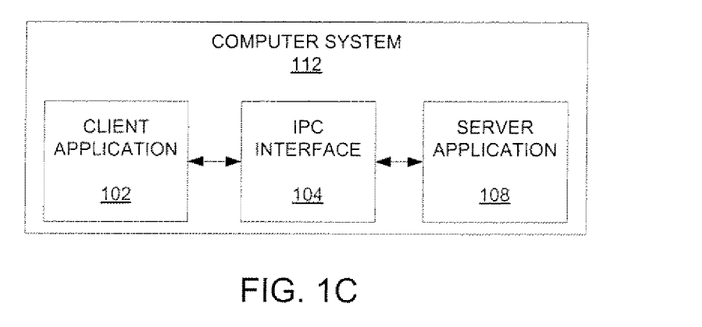
FIG. 1C is a block diagram illustrating another embodiment of a system for sharing a reusable IPC library.

FIG. 1C illustrates another embodiment where client application 102 and server application 108 reside within the same computer system 112. Client application 102 communicate with server application 108 with IPC interface 104.

Figure 2:
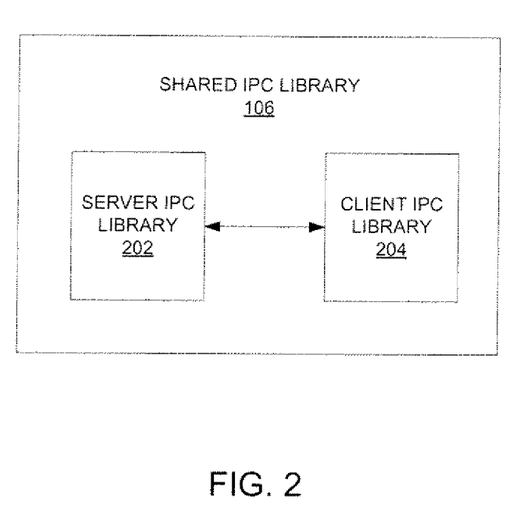
FIG. 2 is a block diagram illustrating one embodiment of a shared reusable IPC library.

FIG. 2 is a block diagram illustrating one embodiment of a shared reusable IPC library 106. Shared reusable IPC library 106 includes a server IPC library 202 and a client IPC library 204. IPC server library 202 also referred to as coroipcs.so is responsible for the server implementation. IPC server library 202 is linked with server application 108 and then initialized with coroipcs_init(3). Once the library is initialized, it will provide service to coroipcc.so library users.

IPC client library 204 also referred to as coroipcc.so is responsible for the client implementation. This library is linked with client application 102 and requires no initialization. This library provides communication functions for sending and receiving synchronous requests, and also reading asynchronous message requests from the server.

Server IPC library 202 provides an initialization function which allows the initialization of external functions to handle various operations required by the IPC library. For example, these functions include:

(1) a memory allocation routine taking an input of size of bytes and returning a pointer to a memory address;

(2) a memory free routine taking an input of memory address;

(3) a logging function which takes as input a log priority, formatting string, and format parameters;

(4) a function which takes as input the ipc service and returns a function that should be called when the ipc connection with that service id exits;

(5) a function which takes as input a service and message id and returns a function to be called when a request for that message is received by the IPC server;

(6) a function which takes as input a service and returns a private data size for that service;

(7) a function which takes as input a uid and gid and returns if that uid or gid is authorized to access the server;

(8) a function which is called to lock other ipc operations from occurring during a call to the message handler for an ipc connection;

(9) a function which is called to unlock other ipc operations from occurring when a call completes to a message handler;

(10) a function to identify if sending is allowed taking as inputs service id, message id, and a private data area specifically for sending_allowed operations;

(11) a function to revert any sending_allowed private data operations;

(12) a function to be called by the main event loop which in turn calls the ipc server library function for handling the "accept" operation;

(13) a function to be called by the main event loop which in turn calls the ipc server library unction for handling a new event operation;

(14) a function to add a file descriptor to the main event loop;

(15) a function to modify the main event loop taking as input file descriptor and new events;

In one embodiment, server IPC library 202 also provides an operation to increment a reference count on a IPC connection to lock it into memory, an operation to decrement a reference count on an IPC connection, an operation to obtain a pointer to the private data allocated when the IPC connection was created of the size specified by the user callback in the init function.

Furthermore, server application 108 also provides a function to send an IPC message to the synchronous "response queue", a function to send an IPC message to the asynchronous "dispatch queue." In another embodiment, both functions operate on I/O vectors instead of data blocks.

In one embodiment, client application 102 includes services to communicate with IPC server 106. These services includes, for example:

(1) a mechanism to send a request and receive a response;
(2) a mechanism to connect to the ipc server;
(3) a mechanism to disconnect from the ipc server.
(4) a mechanism to read the async dispatch message
(5) a mechanism to obtain a file descriptor to use select or poll to wait for an async dispatch message
(6) a mechanism to determine if flow control is enabled.

Figure 3:
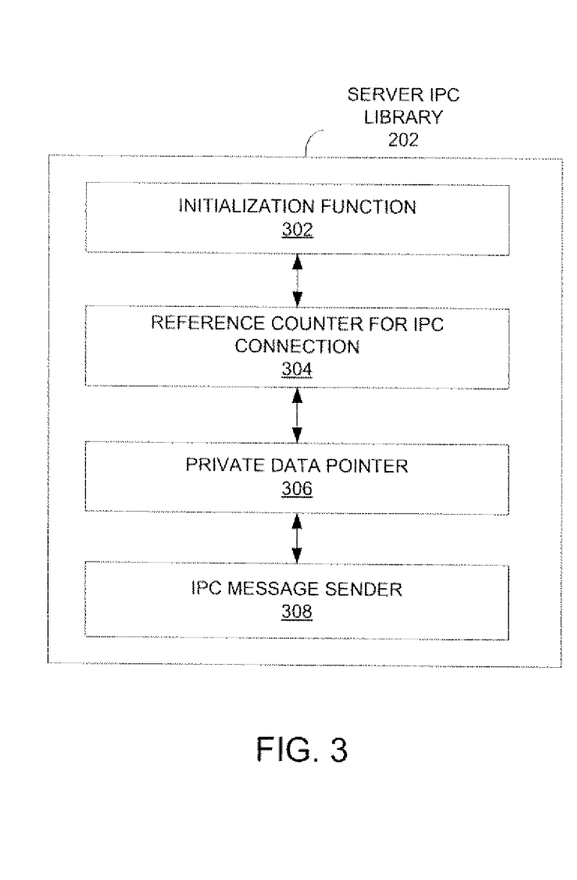
FIG. 3 is a block diagram illustrating one embodiment of a server IPC library.

FIG. 3 is a block diagram illustrating one embodiment of server IPC library 202. Server IPC library 202 includes an initialization function 302, a reference counter for IPC connection 304, a private data pointer 306, an IPC message sender 308.

To use the coroipcs library, the developer creates a coroipcs_init_state structure and populates it with function names. The functions do various operations described below in coroipcs_init(3). Not all operations must be specified. If some are missing, the corosync IPCS library will automatically populate the structure with internal versions which provide basic functionality.

The following code is an example of a server IPC library:

```
#ifndef COROIPCS_H_DEFINED
#define COROIPCS_H_DEFINED
#include <stdlib.h>
#define SOCKET_SERVICE_INIT 0xFFFFFFFF
typedef int (*coroipcs_init_fn_lvalue) (void *conn);
typedef int (*coroipcs_exit_fn_lvalue) (void *conn);
typedef void (*coroipcs_handler_fn_lvalue) (void *conn, void *msg);
struct coroipcs_init_state {
    const char *socket_name;
    void *(*malloc) (size_t size);
    void (*free) (void *ptr);
    void (*log_printf) (
        const char *format,
        ...) __attribute__((format(printf, 1, 2)));
    int (*service_available)(unsigned int service);
    int (*private_data_size_get)(unsigned int service);
    int (*security_valid)(int uid, int gid);
    void (*serialize_lock)(void);
    void (*serialize_unlock)(void);
    int (*response_size_get)(unsigned int service, unsigned int id);
    int (*response_id_get)(unsigned int service, unsigned int id);
    int (*sending_allowed)(unsigned int service, unsigned int id,
        void *msg, void *sending_allowed_private_data);
    void (*sending_allowed_release)(void
    sending_allowed_private_data);
    void (*poll_accept_add)(int fd);
    void (*poll_dispatch_add)(int fd, void *context);
```

-continued

```
    void (*poll_dispatch_modify)(int fd, int events);
    void (*fatal_error)(const char *error_msg);
    coroipcs_init_fn_lvalue (*init_fn_get)(unsigned int service);
    coroipcs_exit_fn_lvalue (*exit_fn_get)(unsigned int service);
    coroipcs_handler_fn_lvalue (*handler_fn_get)(unsigned int
    service, unsigned int d);
};
extern void coroipcs_ipc_init (
    struct coroipcs_init_state *init_state);
extern void *coroipcs_private_data_get (void *conn);
extern int coroipcs_response_send (void *conn, void *msg, int mlen);
extern int coroipcs_response_iov_send (void *conn, struct iovec
iov, int iov_len);
extern int coroipcs_dispatch_send (void *conn, void *msg, int mlen);
extern int coroipcs_dispatch_iov_send (void *conn, struct iovec
iov, int iov_len);
extern void coroipcs_refcount_inc (void *conn);
extern void coroipcs_refcount_dec (void *conn);
extern void coroipcs_ipc_exit (void);
extern int coroipcs_handler_accept (int fd, int revent, void *context);
extern int coroipcs_handler_dispatch (int fd, int revent, void *context);
#endif /* COROIPCS_H_DEFINED */
```

Figure 4:
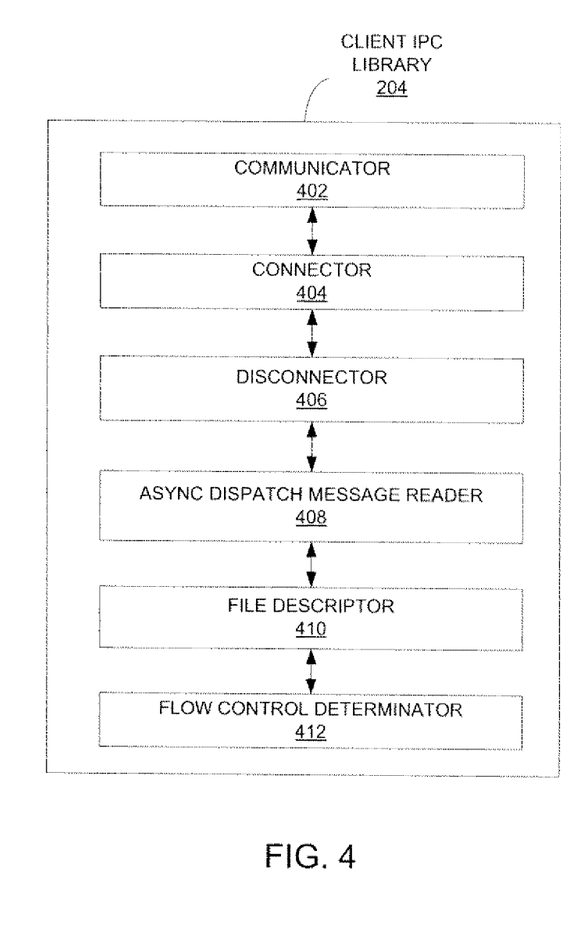
FIG. 4 is a block diagram illustrating one embodiment of a client IPC library.

FIG. 4 is a block diagram illustrating one embodiment of a client IPC library. Client IPC library 204 includes IPC communicator 402, a connector 404, a disconnector 406, an asynchronous dispatch message reader 408, a file descriptor 410, and a flow control determinator 412. As previously noted, no initialization is required for client IPC library 204.

Every IPC connection is represented by a void * pointer which uniquely identifies the data set for the IPC connection. Each IPC connection also contains user defined private data. To obtain this private data pointer, the function coroipcs_private_data_get(3) function can be called.

There are two channels for communication. The primary channel is the synchronous request/response channel. Another channel is available for out of band asynchronous responses from the server.

To send a response on the synchronous channel, coroipcs_response_send(3) or coroipcs_response_iov_send(3) should be used. To send a message on the asynchronous channel, coroipcs_dispatch_send(3) or coroipc_dispatch_iov_send(3) should be used.

The following code is an example of a client IPC library:

```
#ifndef COROIPCC_H_DEFINED
#define COROIPCC_H_DEFINED
#include <pthread.h>
#include <sys/poll.h>
#include <sys/socket.h>
#include <corosync/corotypes.h>
#include <corosync/hdb.h>
#ifdef __cplusplus
extern "C" {
#endif
extern cs_error_t
coroipcc_service_connect (
        const char *socket_name,
        unsigned int service,
        size_t request_size,
        size_t respnse_size,
        size_t dispatch_size,
        hdb_handle_t *handle);
extern cs_error_t
coroipcc_service_disconnect (
        hdb_handle_t handle);
extern cs_error_t
coroipcc_fd_get (
        hdb_handle_t handle,
        int *fd);
extern cs_error_t
coroipcc_dispatch_get (
```

-continued

```
              hdb_handle_t handle,
              void **buf,
              int timeout);
extern cs_error_t
coroipcc_dispatch_put (
              hdb_handle_t handle);
extern cs_error_t
coroipcc_dispatch_flow_control_get (
              hdb_handle_t handle,
              unsigned int *flow_control_state);
extern cs_error_t
coroipcc_msg_send_reply_receive (
              hdb_handle_t handle,
              const struct iovec *iov,
              unsigned int iov_len,
              void *res_msg,
              size_t res_len);
extern cs_error_t
coroipcc_msg_send_reply_receive_in_buf_get (
              hdb_handle_t handle,
              const struct iovec *iov,
              unsigned int iov_len,
              void **res_msg);
extern cs_error_t
coroipcc_msg_send_reply_receive_in_buf_put (
              hdb_handle_t handle);
              extern cs_error_t
              coroipcc_zcb_alloc (
              hdb_handle_t handle,
              void **buffer,
              size_t size,
          size_t header_size);
extern cs_error_t
coroipcc_zcb_free (
              hdb_handle_t handle,
              void *buffer);
extern cs_error_t
coroipcc_zcb_msg_send_reply_receive (
              hdb_handle_t handle,
              void *msg,
              void *res_msg,
              size_t res_len);
#ifdef __cplusplus
}
#endif
#endif /* COROIPCC_H_DEFINED */
```

Figure 5:
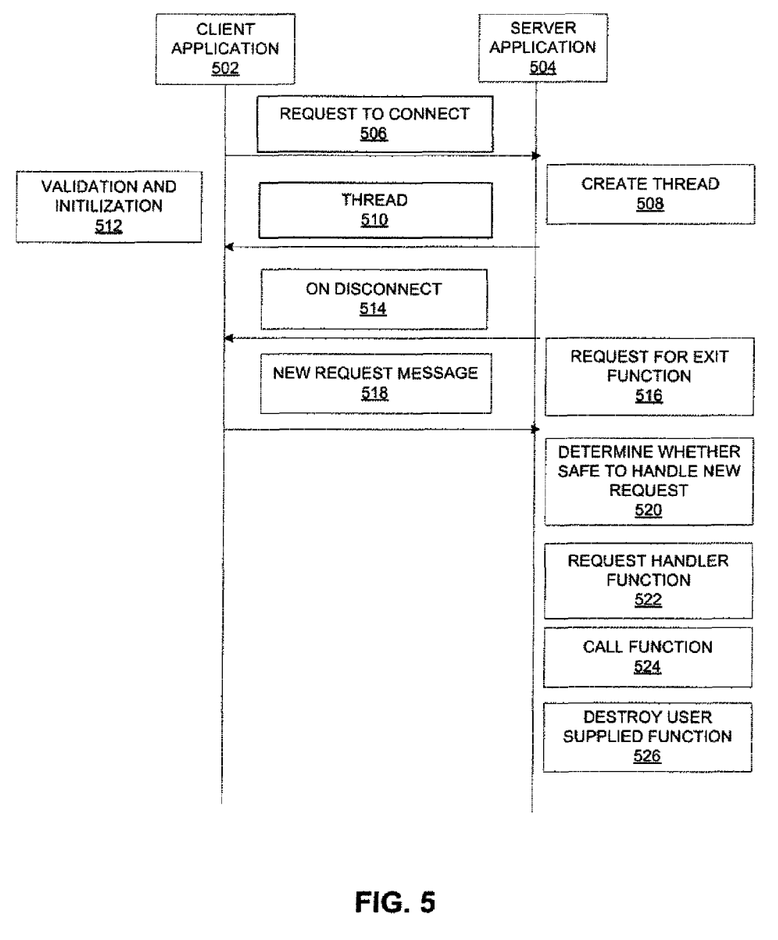
FIG. 5 is a ladder diagram illustrating an example of a client and a server sharing an IPC library.

FIG. 5 is a ladder diagram illustrating an example of a client application 502 and a server application 504 sharing a shared reusable IPC library. Client application 502 communicate with server application 504 over a communication port configured with shared reusable IPC library. Client application 502 sends a request to connect 506 to server application 504. On connection from client application 502, server application 504 creates a thread at 508. The thread 510 listens for an initialization request. The request's IPC security context Uid or GID is validated against the user supplied function in the init function at 512. If it passes, it initializes the IPC system to the service specified. It should be noted that in one embodiment, an IPC system will only have 1 service id (of 0).

On disconnect from client 502 at 514, server 504 requests the proper exit function at 516 from the function specified in the init function to call to initiate a controlled shutdown of the IPC connection.

When a new request message 518 is received, server application 504 determines if it can process it by requesting the application supplied send ok function to indicate if it is safe to handle the request at 520. If it is safe to handle the request, server application 504 requests the proper handler function from the function specified in the init function at 522 and calls it with the message contents and the conn structure 524. After this operation completes, the send ok destroy user supplied unction is called to destroy any user supplied variables at 526. Prior to the delivery of the message, the user supplied lock function is called. After delivery of the message, the user supplied unlock function is called.

In one embodiment, the handler could access the private data of the connection by calling the service which returns the private data and takes as input a conn pointer. The handler could do some work and respond to the library with the normal sync request/response method. The handler could also generate output to be handled asynchronously.

One major aspect of the init user supplied functions is to provide a wrapper mechanism around whichever event loop is used in the system.

Figure 6:
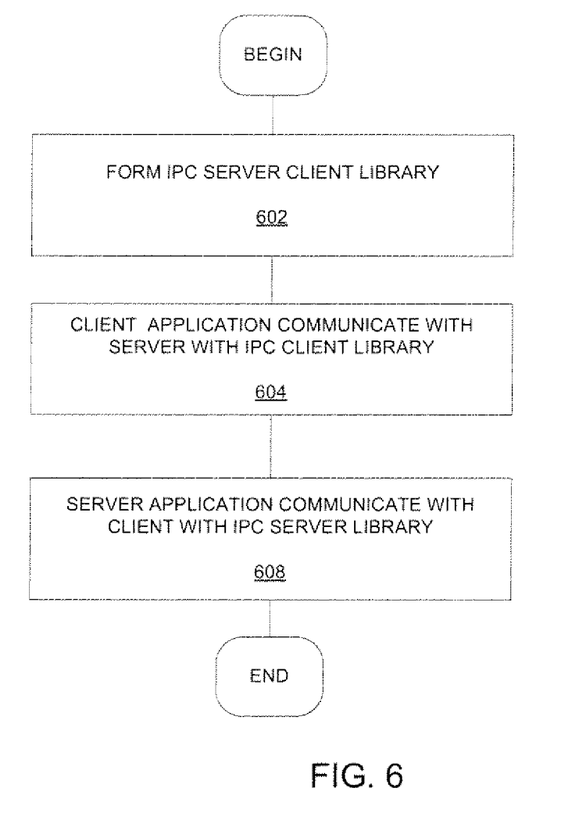
FIG. 6 is a flow diagram illustrating one embodiment of a method for sharing an IPC library.

FIG. 6 is a flow diagram illustrating one embodiment of a method for sharing an IPC library. At 602, an IPC library if formed. The IPC library includes a server IPC library and a client IPC library. At 604, a client application communicates with a server application using the IPC client library. At 606, the server application communicates with the client application using the IPC server library. The shared reusable IPC library provides a unified implementation for different client applications and server applications.

Figure 7:
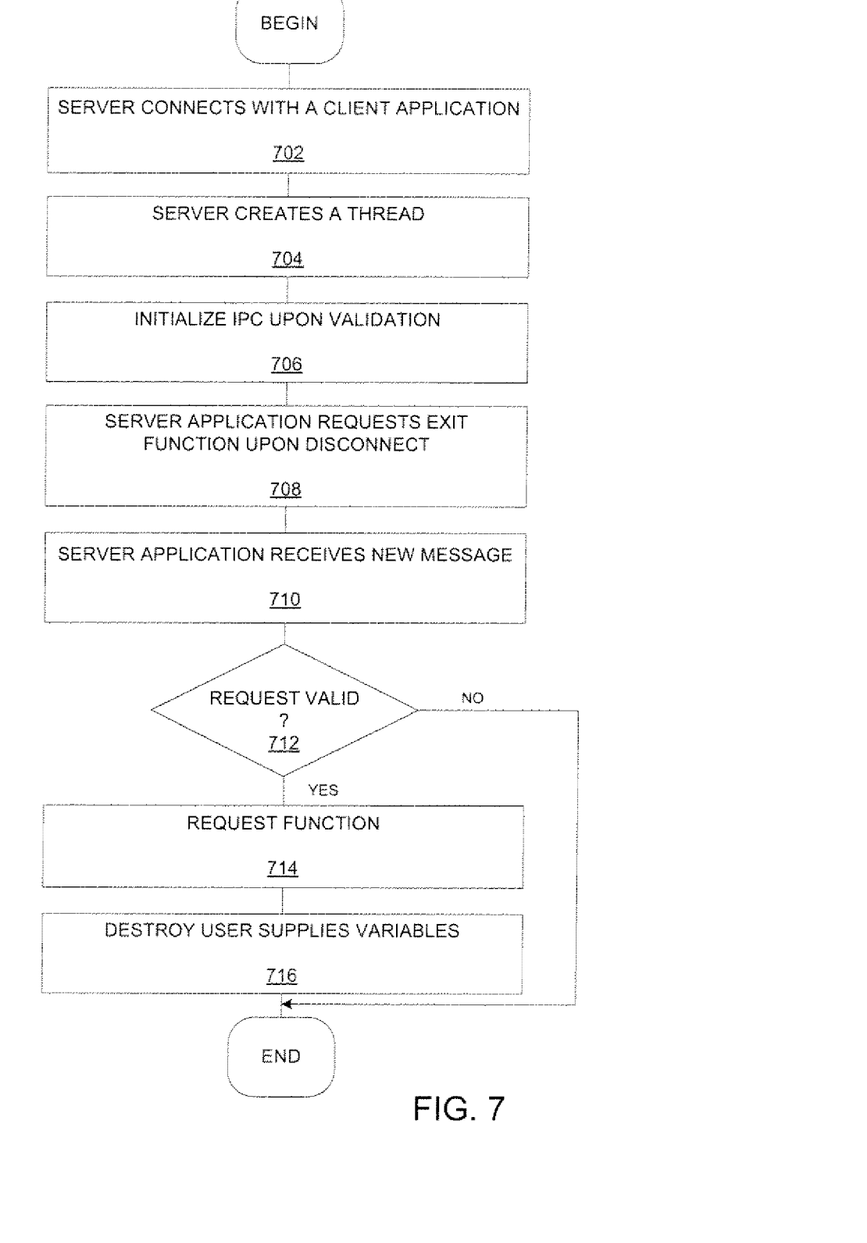
FIG. 7 is a flow diagram illustrating one embodiment of a method for a server to share an IPC library.

FIG. 7 is a flow diagram illustrating one embodiment of a method for a server application to share an IPC library. At 702, a server application connects with a client application. At 704, the server application creates a thread for that connection. At 706, the thread listens for an initialization request and the request's IPC security context Uid or GID is validated against the user supplied function in the init function. If it passes, it initializes the IPC system to the service specified at 706.

On disconnect from the client application, the server application requests the proper exit function at 708 from the function specified in the init function to call to initiate a controlled shutdown of the IPC connection.

When a new request message 710 is received, the server application determines if it can process it by requesting the application supplied send ok function to indicate if it is safe to handle the request at 712. If it is safe to handle the request, server requests the proper handler function from the function specified in the init function at 714 and calls it with the message contents and the conn structure. After this operation completes, the send ok destroy user supplied function is called to destroy any user supplied variables at 716. Prior to the delivery of the message, the user supplied lock function is called. After delivery of the message, the user supplied unlock function is called.

Figure 8:
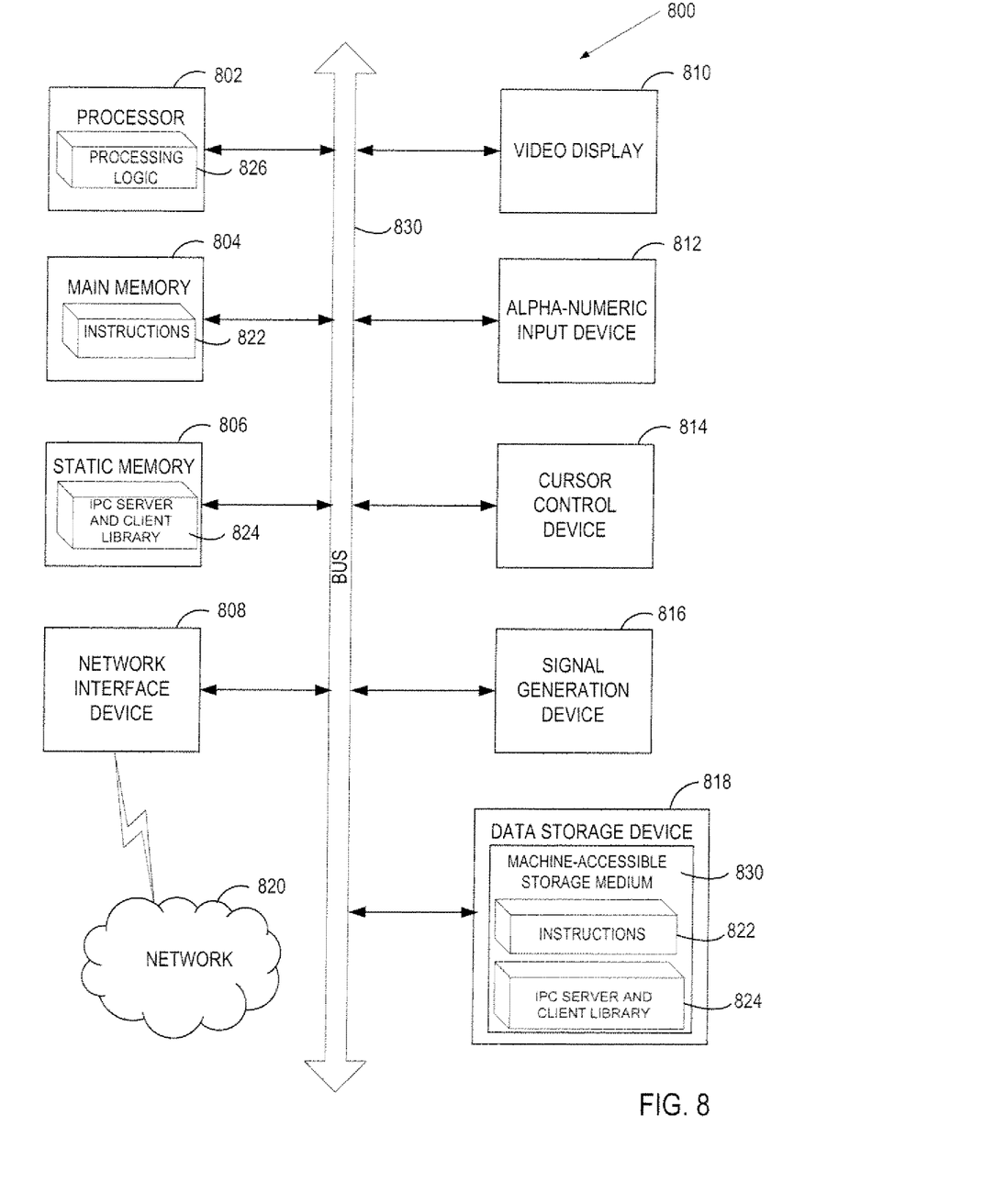
FIG. 8 is a block diagram illustrating an example of a computer system.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), a static memory 806 (e.g., flash memory static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute modules 826 (previously described with respect to FIG. 1) for performing the operations and steps discussed herein with. In one embodiment, the modules may be include hardware or software or a combination of both.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-accessible storage medium 830 on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting computer-accessible storage media. The software 822 may further be transmitted or received over a network 820 via the network interface device 808.

The computer-accessible storage medium 830 may also be used to store the IPC library 824 as presently described. The IPC library 824 may also be stored in other sections of computer system 800, such as static memory 806.

While the computer-accessible storage medium 830 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   forming, by a processing device, a client server interprocess communication (IPC) interface comprising a unified IPC library for a client application and a server application, the unified IPC library comprising a client IPC library and a server IPC library;

providing, by the processing device, an initialization function in the server IPC library to establish an IPC connection between the client application and the server application in request to a first IPC message among a plurality of IPC messages in the client IPC library, wherein the initialization function initializes a plurality of functions at the server application;

interfacing, by the processing device, at the client IPC interface, the client application with the client IPC library and the server application with the server IPC library, wherein the client application communicates with the server application by transmitting data associated with executing of the first IPC message from the client IPC library of the unified IPC library to the server IPC library of the unified IPC library, wherein the server IPC library sends the data to the server application;

the server application to share the unified IPC library, wherein the sharing comprising:
  initializing, by the processing device, a communication with the server application upon validation of a security object in an initialization request against the initialization function;
  in response to determining that the security object is valid, requesting, by the processing device, an exit function from the plurality of functions for a shutdown of the communication at the server application upon disconnection from the client application; and
  requesting, by the processing device, a proper handler function from the plurality of functions with replying to a request with a second IPC message among the plurality of IPC messages in the client IPC library of the unified IPC library with parameters previously defined in the IPC connection.

2. The method of claim 1, wherein the client IPC library comprises instructions for at least one of creating, destroying, sending, and receiving the plurality of IPC messages to and from the client application.

3. The method of claim 2, further comprising:
connecting a server application with a client application to yield a connection; and
creating a thread at the server application, the thread listening for an initialization request.

4. The method of claim 2, wherein the server IPC library provides for an operation to increment a reference count on an IPC connection to lock the IPC connection into a memory and an operation to decrement the reference count on the IPC connection.

5. The method of claim 2, wherein the server IPC library provides for an operation to obtain a pointer to private data allocated when an IPC connection was created of a size specified by a user callback in the initialization function.

6. The method of claim 2, wherein the server IPC library provides a function to send an IPC message among the plurality of IPC messages to at least one of a synchronous response queue or an asynchronous dispatch queue.

7. The method of claim 2, wherein the client IPC library provides a function to send a request and receive a response with the server IPC library.

8. The method of claim 2, wherein the client IPC library provides a function to connect and disconnect with the server IPC library.

9. The method of claim 2, wherein the client IPC library provides a function to read an asynchronous dispatch message.

10. The method of claim 2, wherein the client IPC library provides a function to obtain a file descriptor to use, select, or poll to wait for an asynchronous dispatch message.

11. The method of claim 2, wherein the client IPC library provides a function to determine whether a flow control is enabled.

12. A non-transitory computer-readable storage medium, having instructions stored therein, which when executed by a processing device, cause the processing device to:
  form, by the processing device, a client server interprocess communication (IPC) interface comprising a unified IPC library for a client application and a server application, the unified IPC library comprising a client IPC library and a server IPC library;
  provide, by the processing device, an initialization function in the server IPC library to establish an IPC connection between the client application and the server application in request to a first IPC message among a plurality of IPC messages in the client IPC library, wherein the initialization function initializes a plurality of functions at the server application;
  interface, by the processing device, at the client IPC interface, the client application with the client IPC library and the server application with the server IPC library, wherein the client application communicates with the server application by transmitting data associated with executing of the first IPC message from the client IPC library of the unified IPC library to the server IPC library of the unified IPC library, wherein the server IPC library sends the data to the server application;
  the server application to share the unified IPC library, wherein to share, the server application is to:
    initialize, by the processing device, a communication with the server application upon validation of a security object in an initialization request against the initialization function;
    in response to determining that the security object is valid, request, by the processing device, an exit function from the plurality of functions for a shutdown of the communication at the server application upon disconnection from the client application; and
    request, by the processing device, a proper handler function from the plurality of functions with replying to a request with a second IPC message among the plurality of IPC messages in the client IPC library of the unified IPC library with parameters previously defined in the IPC connection.

13. The non-transitory computer-readable storage medium of claim 12, wherein the client IPC library comprises instructions for at least one of creating, destroying, sending, and receiving the plurality of IPC messages to and from the client application.

14. The non-transitory computer-readable storage medium of claim 13, wherein the processing device is to:
connect a server application with a client application to yield a connection; and
create a thread at the server application, the thread listening for an initialization request.

15. A system comprising:
a memory; and
a processing device coupled with the memory to:
  form a client server interprocess communication (IPC) interface comprising a unified IPC library for a client application and a server application, the unified IPC library having a server IPC library and a client IPC library;

provide an initialization function in the server IPC library to establish an IPC connection between the client application and the server application in request to a first IPC message among a plurality of IPC messages in the client IPC library, wherein the initialization function initializes a plurality of functions at the server application;

interface at the client IPC interface, the client application with the client IPC library and the server application with the server IPC library, wherein the client application communicates with the server application by transmitting data associated with executing of the first IPC message from the client IPC library of the unified IPC library to the server IPC library of the unified IPC library, wherein the server IPC library sends the data to the server application;

the server application to share the unified IPC library, wherein to share, the server application is to:
  initialize communication with the server application upon validation of a security object in an initialization request against the initialization function;
  in response to determining that the security object is valid, request an exit function from the plurality of functions for a shutdown of the communication at the server application upon disconnection from the client application; and
  request a proper handler function from the plurality of functions with replying to a request with a second IPC message among the plurality of IPC messages in the client IPC library of the unified IPC library with parameters previously defined in the IPC connection.

16. The system of claim 15, wherein the processing device is to:
  connect the server application to the client application module to yield a connection, and
  create a thread at the server application, the thread listening for an initialization request.

17. The system of claim 15, wherein the server IPC library comprises, a reference counter, a private data pointer, and an IPC message sender.

18. The system of claim 15, wherein the client IPC library comprises a communicator, a connector, a disconnector, an asynchronous dispatch message reader, a file descriptor, a flow control determinator, and instructions for creating, destroying, sending, or receiving the plurality of IPC messages to and from the client application.

19. The non-transitory computer-readable storage medium of claim 12, wherein server IPC library provides for a first operation to increment a reference count on an IPC connection to lock the IPC connection into a memory, a second operation to decrement the reference count on the IPC connection, a third operation to obtain a pointer to private data allocated when an IPC connection was created of a size specified by a user callback in the initialization function, and a function to send an IPC message among a plurality of the IPC messages to at least one of a synchronous response queue or an asynchronous dispatch queue.

20. The non-transitory computer-readable storage medium of claim 12, wherein client IPC library provides a first function to send a request and receive a response with the server IPC library, wherein the client IPC library provides the function to connect and disconnect with the server IPC library, a second function to read an asynchronous dispatch message, a third function to obtain a file descriptor to use, select, or poll to wait for an asynchronous dispatch message, and a fourth function to determine whether a flow control is enabled.

\* \* \* \* \*